United States Patent [19]

Tsuchihashi et al.

[11] Patent Number: 4,906,907
[45] Date of Patent: Mar. 6, 1990

[54] ROBOT SYSTEM

[75] Inventors: Akira Tsuchihashi, Nagareyama; Shinichi Takarada, Yokohama, both of Japan

[73] Assignee: Hitachi, Ltd., Tokyo, Japan

[21] Appl. No.: 175,318

[22] Filed: Mar. 30, 1988

[30] Foreign Application Priority Data

Mar. 30, 1987 [JP] Japan .................. 62-74001

[51] Int. Cl.⁴ .......................................... G05B 19/42
[52] U.S. Cl. ................. 318/568.22; 318/574; 318/577; 318/568.16; 901/15; 901/17; 901/34; 364/513
[58] Field of Search ............................ 318/562-577; 901/1, 9, 14, 15, 16, 17, 18, 19, 21, 23, 24, 30-34, 38, 46; 364/513; 414/739, 740

[56] References Cited

U.S. PATENT DOCUMENTS

| | | | |
|---|---|---|---|
| 4,243,923 | 1/1981 | Whitney et al. | 901/15 X |
| 4,278,920 | 7/1981 | Ruoff, Jr. | 364/513 X |
| 4,305,130 | 12/1981 | Kelley et al. | 901/7 X |
| 4,380,696 | 4/1983 | Masaki | 901/47 X |
| 4,530,062 | 7/1985 | Inaba et al. | 318/632 X |
| 4,533,167 | 8/1985 | Johnson | 901/34 X |
| 4,547,858 | 10/1985 | Horak | 901/15 X |
| 4,603,284 | 7/1986 | Perzley | 318/568 M X |
| 4,616,121 | 10/1986 | Clocksin et al. | 318/577 X |
| 4,621,332 | 11/1986 | Sugimoto et al. | 318/568 X |
| 4,661,032 | 4/1987 | Arai | 318/568 X |
| 4,675,502 | 6/1987 | Haefner et al. | 318/574 X |
| 4,761,596 | 8/1988 | Nio et al. | 318/568 |

OTHER PUBLICATIONS

"Virtual Compliance Control of Multiple Degree of Freedom Robot", Digests of the Society of Instrument and Control Engineer, vol. 22, No. 3 (Mar., 1986), pp. 343-349.
"Robot Manipulators: Mathematics, Programming, and Control", Rehard P. Paul, the MIT Press (cover only).

Primary Examiner—William M. Shoop, Jr.
Assistant Examiner—Paul Ip
Attorney, Agent, or Firm—Antonelli, Terry & Wands

[57] ABSTRACT

A robot system in which a force (torque) exerted on an end effector disposed at an end of a robot to hold an object is sensed to achieve a positioning control. The robot system includes a unit to sense an inertial force exerted on the end effector and the sensed result is fed back so as to remove the influence of the inertia force, thereby effecting an accurate positioning control.

22 Claims, 8 Drawing Sheets

ROBOT SYSTEM

BACKGROUND OF THE INVENTION

The present invention relates to a robot system having a function to hold an object and to move the object to a predetermined position, and in particular, to a robot system of a type in which a force (torque) sensor is employed to effect a control determining a location of the object to be moved.

In the case where an assembling work is achieved by means of a robot system, the positioning accuracy of an operation to hold an object to be moved and to move the object to a target position becomes to be important. Particularly, in the case of a work where a shaft is inserted into a hole with a strict fitting tolerance, the assembling success rate is considerably lowered if there exists unevenness or variations in the positioning accuracy.

Conventionally, as one of the means for controlling the positioning with a high precision or accuracy, there has been used a position control method in which a force (torque) sensor is disposed on a wrist of a robot hand or gripper so as to sense the magnitude and the direction of the force and torque applied in the proximity of a target position on the object to be moved (the force and torque appearing when an interference occurs between the shaft and the hole in the example above), thereby moving the object to a direction in which the force and the torque are reduced. The control method of this kind has been described, for example, in Sugimoto, et al U.S. Pat. No. 4,621,332 and in "Virtual Compliance Control of Multiple Degree of Freedom Robot", Digests of the Society of Instrument and Control Engineers, Japanese issue Vol 22, No. 3 (March, 1986), pp. 343–349.

As represented by Equation (1) in page 344 of the paper above, the movement of the robot gripper is expressed as follows.

$$[M]\frac{d\overline{v}}{dt} = \overline{q} - [K]\overline{\Delta x} - [C]\overline{v} \qquad (1)$$

where,
$\overline{q}$: External force applied on gripper $(\vec{f}\ \vec{F}_r)$
$\overline{v}$: Velocity of gripper $(\vec{v})$
$\overline{\Delta x}$: Deviation of gripper from target position $(\vec{x}-\vec{x}_r)$
[M]: Virtual mass
[K]: Virtual spring constant
[C]: Virtual coefficient of viscosity In the example of a fitting operation between the shaft and the hole, $\overline{v}$, $d\overline{v}/dt$ and $\vec{f}\vec{r}$ are respectively almost 0 and hence, when these factors are neglected, the Equation (1) can be reduced as follows.

$$\overline{q}=[K]\overline{\Delta x}$$

Consequently, when the value of [K] is appropriately selected and the external force $\overline{q}$ is sensed by use of a force (torque) sensor, the deviation $\overline{\Delta x}$ of the position can be computed. Using the result of the computation, the fitting operation by the robot is successfully accomplished.

In the prior art technology, the value sensed by the force (torque) sensor is assumed to be equal to the external force applied to the robot $\overline{q}$ in Equation (1) when the positional deviation is computed.

However, it is quite difficult to sense the force $\overline{q}$ purely applied to the robot gripper. This is because the sense value $\overline{Q}$ obtained by the force (torque) sensor is expressed as follows;

$$\overline{Q} = \overline{q} + [m]\frac{d\overline{v}}{dt} \qquad (2)$$

where [m] is the total mass of the object and the gripper. Namely, the resultant value $\overline{Q}$ includes the inertia force (acceleration) applied to the gripper.

In ordinary cases, as the mass [m] is small, the inertia force exerted on the robot gripper can be neglected as in the above mentioned literature. However, in the case where the value of [m] is quite large or in the case of operation in an outer space, the inertia force exerted on the gripper cannot be neglected and hence the accurate positioning control cannot be accomplished.

SUMMARY OF THE INVENTION

It is therefore an object of the present invention to provide a robot system capable of effecting an adaptive positioning control in the case where a large mass is to be moved and where a work is to be carried out or operations conducted in a microgravity condition.

Another object of the present invention is to provide a robot system capable of moving a large mass quickly and safely without damage to either of the robot or the object to be moved.

In order to achieve the objects above, according to the present invention, there is provided a robot system including means for sensing a force (torque) applied to an end effector disposed at an end of a robot, means for sensing an inertia force exerted on the end effector, and means for controlling the robot in accordance with respective results from said sense means.

By use of the inertia force sense means, the inertia force $$[m]\frac{d\overline{v}}{dt}$$

on the end effector holding the object is sensed, and the obtained value of the inertia force is subtracted from the sensed value $\overline{Q}$ of the force (torque) sense means, thereby attaining the external force $\overline{q}$ purely applied externally to the end effector. Based on information thus attained, the control means controls the robot so as to achieve an adaptive, safe and speedy positioning control.

BRIEF DESCRIPTION OF THE DRAWINGS

The present invention will be apparent from the following detailed description taken in conjunction with the accompanying drawings in which.

DESCRIPTION OF THE PREFERRED EMBODIMENTS

Figure 1:
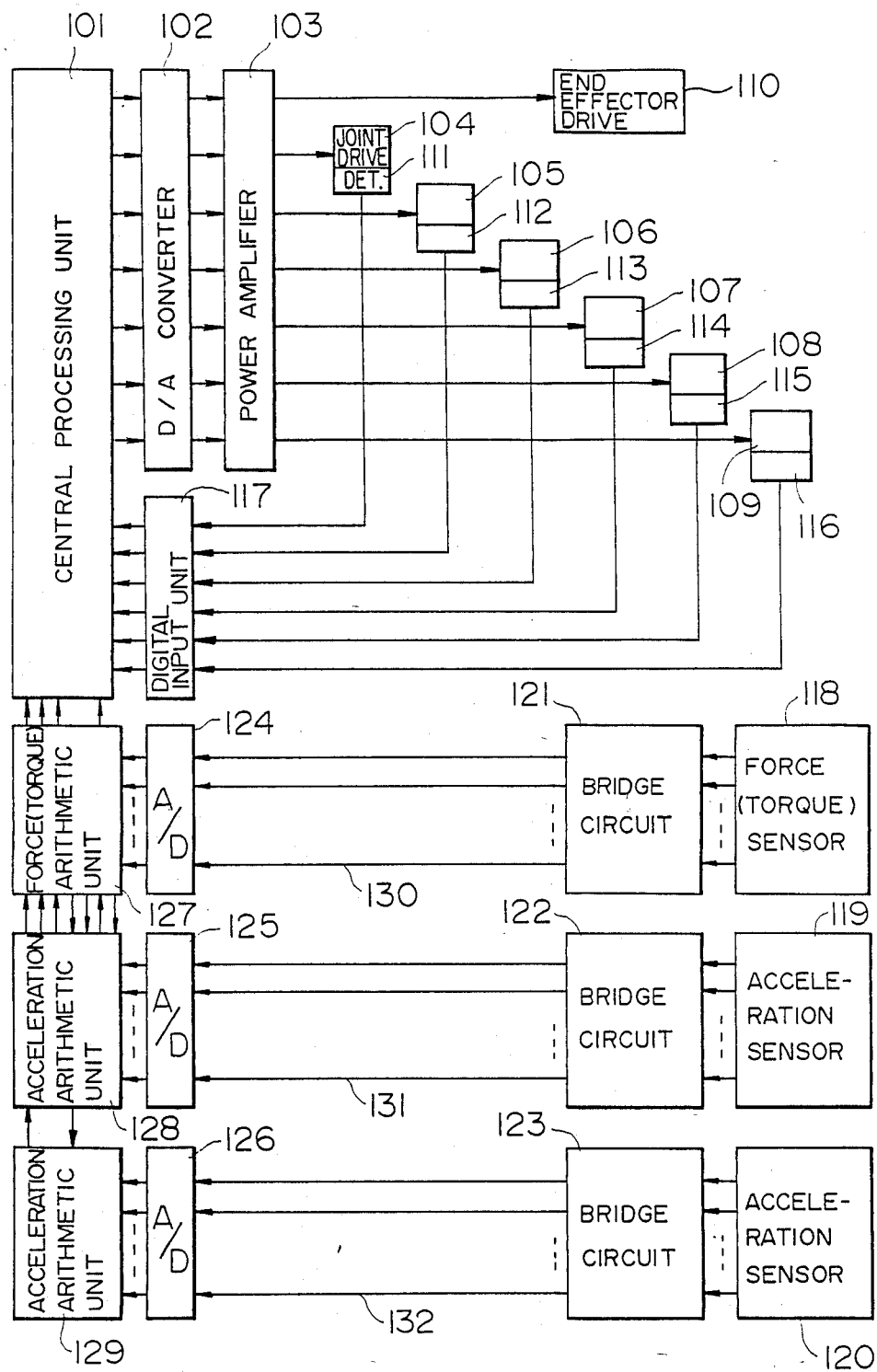
FIG. 1 is a schematic diagram showing the system configuration of a robot system of an embodiment according to the present invention.

FIG. 1 shows a system configuration diagram of a robot system as an embodiment according to the present invention. This configuration includes a central processing unit 101 controlling the overall robot system, a digital-to-analog (D/A) converter 102, and a power amplifier 103. The manipulator section of this apparatus is assumed to have six joints and hence, there are disposed drive units 104 to 109 to respectively drive the first joint to the sixth joint, and angular detectors 111 to 116 located at the first joint to the sixth joint, respectively. Reference numerals 110 and 117 respectively indicate a drive unit for driving the end effector holding an object and a digital input unit for inputting a sense result of each angular detector to the central processing unit 101.

In addition, the configuration comprises a force (torque) sensor 118 disposed between the end effector and the end of the robot, an acceleration sensor 119 located between the end effector and the end of the robot, an acceleration sensor 120 disposed between the first link of the robot and a base on which the robot hand is mounted, bridge circuits 121 to 123, analog-to-digital (A/D) converters 124 to 126, a force (torque) arithmetic unit 121, and acceleration arithmetic units 128 and 129.

Figure 2:
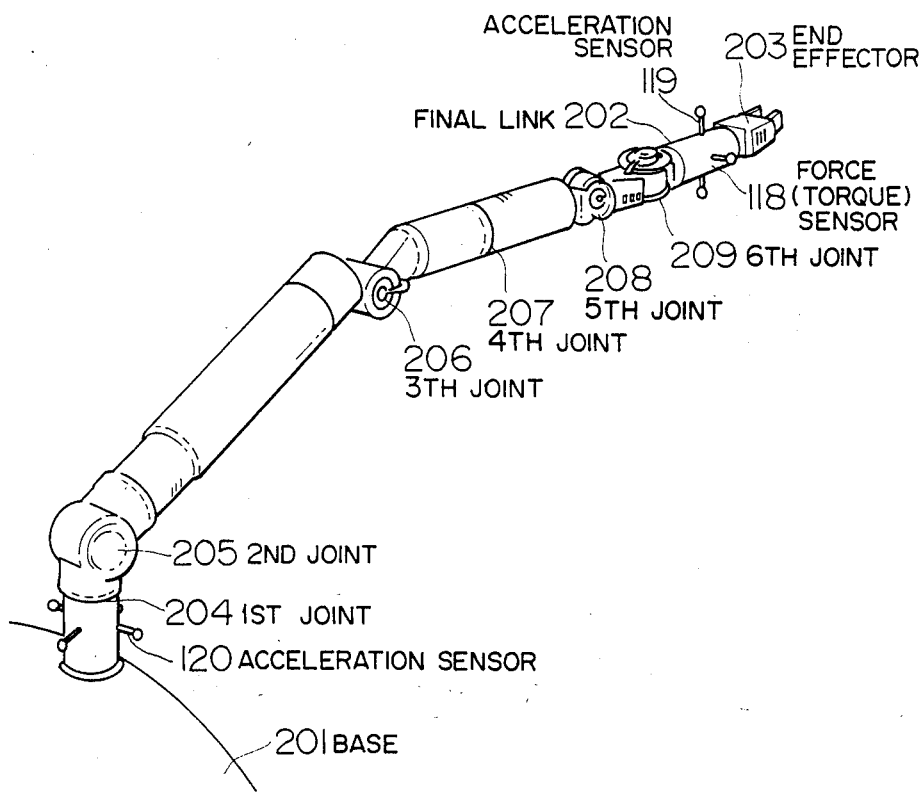
FIG. 2 is a diagram showing an external appearance of a manipulator section of the robot system of FIG. 1.

FIG. 2 shows an external appearance of the manipulator section of the robot system, which includes six joints 204 to 209 and a first drive unit 104 integrated therein for axially rotating the arm at the joint 204. Similarly, each arm includes a drive unit to rotate the respective joint in the pertinent direction and various signal lines, and each joint is provided with an angular detector for detecting an angle of the joint. A force-torque sensor 118 is disposed to sense a force (torque) applied to an end 202. Acceleration sensors 119 and 120 are used to sense acceleration values at the end 202 and the base 201.

Figure 3:
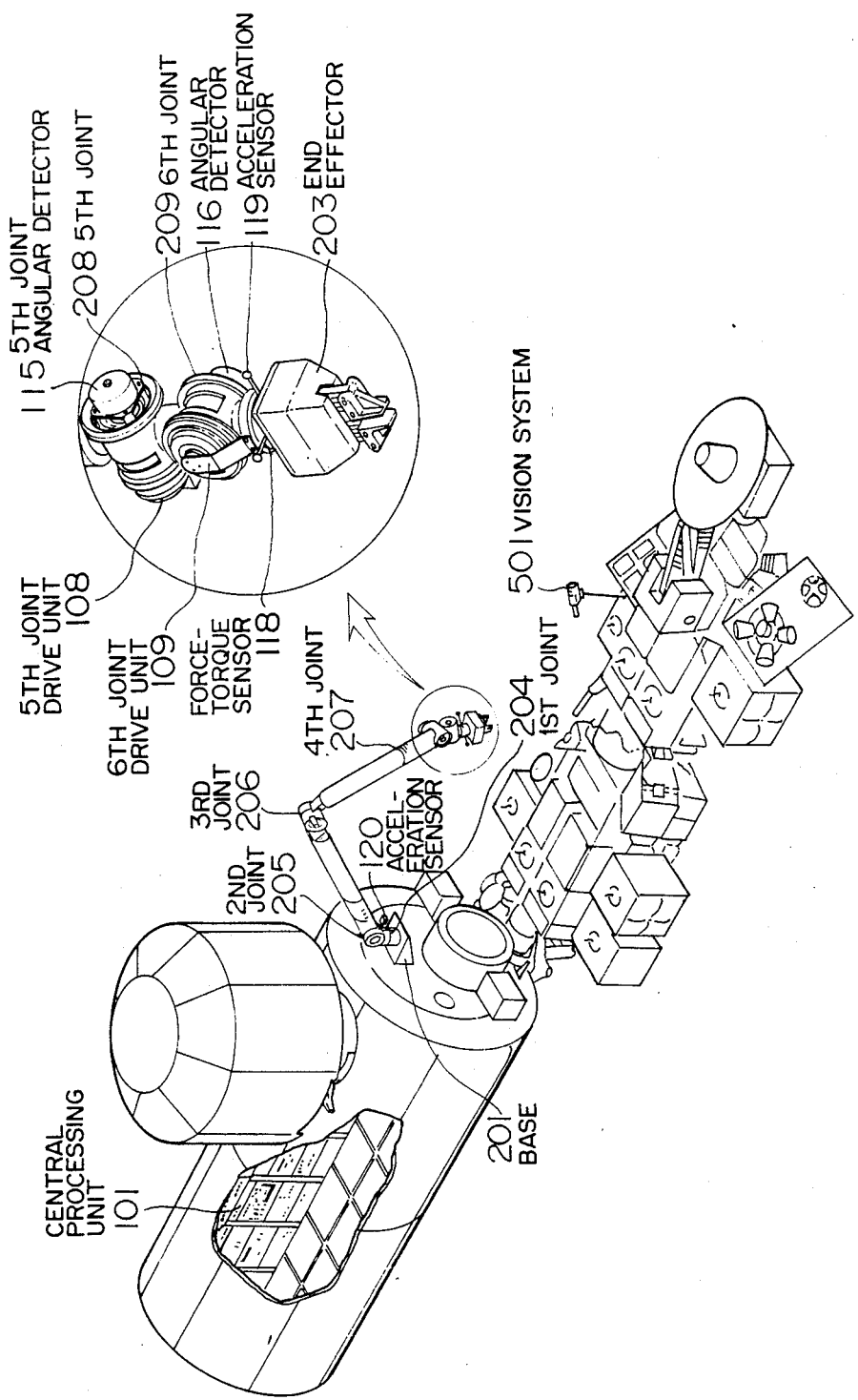
FIG. 3 is a diagram showing an external appearance of a spacecraft loaded with a robot system according to the present invention and an end of the robot system.

FIG. 3 shows an external appearance of a spacecraft loaded with the robot system and the end of the robot. In the spacecraft, there are mounted a central processing unit 101 controlling the overall robot system, a D/A converter 102, a power amplifier 103, a digital input unit 117, A/D converters 124 to 126, a force (torque) arithmetic unit 127, and acceleration arithmetic units 128 and 129. The manipulator section of the robot system is fixed on a base 201 located in the body of the spacecraft so as to enable various works to be effected outside the spacecraft. Reference numeral 501 indicates a vision system, which will be described later in the present specification.

Next, the flow of signals of this system will be described.

In FIG. 1, output values determined by the central processing unit 101 so as to be supplied to the respective joint drive units are converted into analog signals through the D/A converter 102. The resultant signals are fed through the power amplifier 103 and are used to operate the joint drive units including the first joint drive unit 104 to sixth joint drive unit 109. The angles of the joints are sensed by the respective angular detectors 111 to 116 and are supplied from the digital input unit 117 to the central processing unit 101. On the other hand, a signal sensed by the force (torque) sensor 118 and undergone processing of the bridge circuit 121 and a signal sensed by the acceleration sensor 119 disposed at the same location as the force (torque) sensor 118 and undergone processing of the bridge 122 are respectively delivered through the A/D converters 124 and 125 to the force (torque) arithmetic unit 127 and the acceleration arithmetic unit 128, respectively. Similarly, a signal attained by the acceleration sensor 120 and undergone processing of the bridge 123 is supplied via the A/D converter 126 to the acceleration arithmetic unit 129.

Outputs from the force (torque) arithmetic unit 127 and the acceleration arithmetic units 128 and 129 are inputted to the central processing unit 101, which in turn effects a control of the target value for the positioning control.

Figure 4:
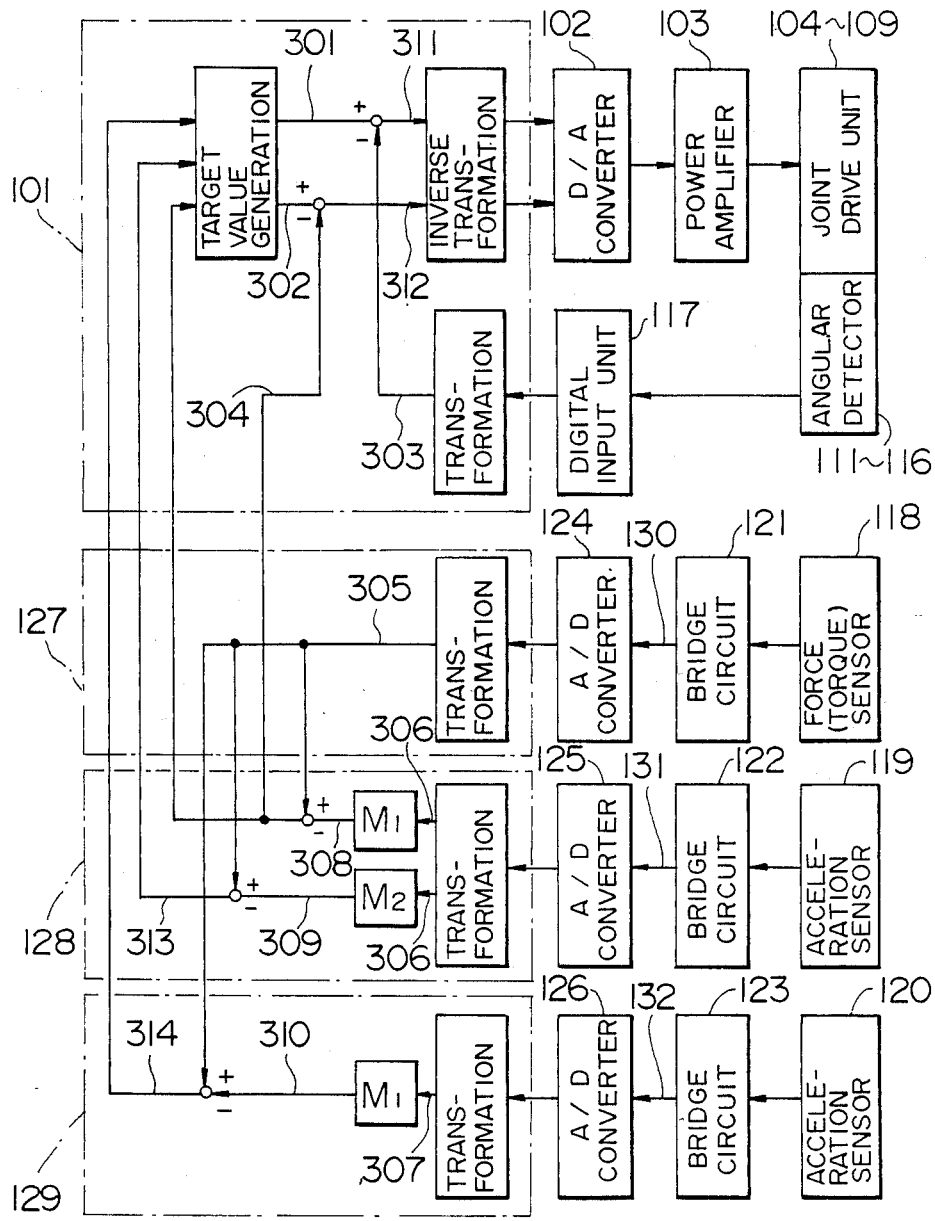
FIG. 4 is a block diagram schematically showing the control logic of the robot system of FIG. 1.

FIG. 4 is a block diagram showing the control logic of the central processing unit 101.

First, according to an operation of the target value generation effected by a job program beforehand inputted, the central processing unit 101 generates a position-/attitude target value 301 and a force (torque) target value 302. From these values, the current position/attitude measured value 303 and the force (torque) measured value 304 are respectively subtracted to attain the position/attitude difference value 311 and the force (torque) difference value 312. Using these values, operations of inverse transformation are effected to compute voltage values to be supplied to the drive systems of the respective joints, and in order to operate the drive systems, the control voltages are outputted via the power amplifier 103 to the joint drive units 104 to 109.

The current values of the joint angles developed as the results are sensed by the angular detectors 111 to 116, and the attained values are transformed through the digital input unit 117 so as to obtain the current position/attitude measured value 303, which is then fed back to the position/attitude target value 301.

Incidentally, the control theory described above has been commonly employed and is described, for example, in the "Robot Manipulators: Mathematics, Programming, and Control", Richard P. Paul, the MIT Press.

The lower portion of the block diagram of FIG. 4 to be described herebelow shows the feedback of the force (torque), which is the characteristic feature of the present invention. The force (torque) arithmetic unit 127 receives via the bridge circuit 121 and the A/D converter 124 the force (torque) signal from the force (torque) sensor 118 and then achieves the transformation on the received signal, thereby attaining a force (torque) signal 305 in accordance with the coordinate system fixed to the base. In the prior art technology, the force (torque) signal 305 thus attained is used as the force (torque) signal such that positional information is corrected through a primary correction so as to be employed as information for the feedback or target value generation. However, the signal includes the inertia force applied from the base, the inertia force due to the mass of the end effector, and the inertia force associated with the mass of an object held by the end effector, and hence a control cannot be effected with a satisfactory accuracy when this signal is used for the control.

Consequently, as an example of the secondary correction, the following method is employed in this embodiment.

The acceleration signal from the acceleration sensor 119 attained as a signal 131 through the bridge circuit 122 is inputted via the A/D converter 125 to the acceleration arithmetic unit 128, which in turn effects a transformation on the received signal so as to obtain a signal 306 representing an acceleration and an angular acceleration of the end effector in the coordinate system fixed to the base. In addition, similarly, the acceleration signal from the acceleration sensor 120 on the base is attained as a signal 132 through the bridge circuit 123, and the signal 132 is inputted via the A/D converter to the acceleration arithmetic unit 129, which in turn effects a transformation on the inputted signal so as to attain a signal representing an acceleration and an angular acceleration of the base.

Assume here that the acceleration and the angular acceleration are expressed as follows.

$$Ai = \begin{pmatrix} axi \\ ayi \\ azi \\ \alpha xi \\ \alpha yi \\ \alpha zi \end{pmatrix} \quad \begin{array}{l} axi: \text{x-directional acceleration} \\ ayi: \text{y-directional acceleration} \\ azi: \text{z-directional acceleration} \\ \alpha xi: \text{Angular acceleration about x axis} \\ \alpha yi: \text{Angular acceleration about y axis} \\ \alpha zi: \text{Angular acceleration about z axis} \end{array}$$

$$i \begin{cases} = 1 : \text{Signal 306} \\ = 2 : \text{Signal 307} \end{cases}$$

Mj is defined as follows.

$$M_j = \begin{pmatrix} m_j & 0 & 0 & 0 & 0 & 0 \\ 0 & m_j & 0 & 0 & 0 & 0 \\ 0 & 0 & m_j & 0 & 0 & 0 \\ 0 & 0 & 0 & I_{1j} & 0 & 0 \\ 0 & 0 & 0 & 0 & I_{2j} & 0 \\ 0 & 0 & 0 & 0 & 0 & I_{3j} \end{pmatrix}$$

$$j \begin{cases} = 1: \text{Mass and moment of (the object held by end factor 203 + end factor 203)} \\ = 2: \text{Mass and moment only of end factor 203} \end{cases}$$

where $m_j$ is the mass, and $(I_{1j}, I_{2j}, I_{3j})^T$ is the moment of inertia attained from the following expression.

$$\begin{pmatrix} I_{1j} \\ I_{2j} \\ I_{3j} \end{pmatrix} = T \begin{pmatrix} I_{xj} \\ I_{yj} \\ I_{zj} \end{pmatrix}$$

where,
  $I_{xj}$: Moment of inertia about x axis in the final link coordinate system
  $I_{yj}$: Moment of inertia about y axis in the final link coordinate system
  $I_{zj}$: Moment of inertia about z axis in the final link coordinate system.
T is a matrix of transformation from the final link coordinate system to the coordinate system fixed onto the base.

From the expression above, the signals are attained as follows.

Signal 308 = $M_1 A_1$

Signal 309 = $M_2 A_1$

Signal 310 = $M_1 A_2$.

Consequently, the following information is attained by subtracting these signals from the signal 305. Signal 304: Force (torque) externally exerted purely on the end effector 203 and on an object held by the effector 203.

Signal 313: Force (torque) exerted on the end effector 203 from an object held by the effector 203.

Signal 314: Force (torque) developed when the base 201 is completely free from the acceleration. Namely, this signal is equivalent to the signal appearing on the force (torque) sensor of the robot on the ground.

Through this operation, the force (torque) control can be accomplished with a satisfactory accuracy by feeding back the signal 304 as the force (torque) signal. In addition, the signals 304, 313, and 314 can be utilized for various purposes in the central processing unit, namely, for information to generate target values and for various measurements.

Furthermore, when the mass and the moment of inertia $M_1$ described above are known, the values thereof may be keyed in; however, even when the mass and the moment of inertia are unknown, the values thereof can be obtained in the following method.

Since the value $M_2$ is known, description will be given only of the operation in conjunction with $M_1$. First, immediately after the end effector holds an object, the manipulator is slightly moved in a state where an external force is not exerted. Assume the signal of a force (torque) caused in this situation and the acceleration signal to be $(F'x, F'y, F'z, M'x, M'y, M'z)^T$ and $(a'x, a'y, a'z, \alpha'x, \alpha'y, \alpha'z)^T$, respectively; where, F'i indicates a force in the i-axis direction in the final link coordinate system, M'i denotes the torque about the i axis, and a'i stands for an acceleration in the i-axis direction, and $\alpha'i$ designates an angular acceleration about the i axis. Under these conditions, the mass m associated with $M_1$, namely, the mass the end effector plus the object held by the end effector is expressed as $$m = \sqrt{Fx^2 + Fy^2 + Fz^2} / \sqrt{a'x^2 + a'y^2 + a'z^2}$$

and I'x, I'y, and I'z can be computed from $I'x = M'x/\alpha'x$, $I'y = M'y/\alpha'y$, and $I'z = M'z/\alpha'y$, respectively. Furthermore, since these values are not accurate when attained only at a measuring point, sampling operations are achieved at several points immediately after the operation of the system is started so as to calculate the average values.

The means stated above enables the unknown value of $M_1$ to be attained.

Figure 5:
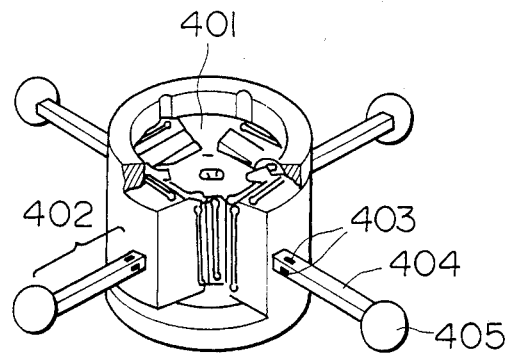
FIG. 5 is a diagram showing an external appearance of a force (torque) sensor and an acceleration sensor employed in the robot system of FIG. 1.

Although the force (torque) sensor 118 and the acceleration sensor 119 of FIG. 1 are assumed to be separate devices, these sensors 118 and 119 may be integrated into a unit as shown in FIG. 5.

FIG. 5 shows a concrete example of an apparatus in which a force-torque sensor 401 and an acceleration sensor 402 are integrally configured in a unit. The force (torque) sensor 401 includes a structure in which a strain gauge is fixed on a beam connecting an outer shell to an inner shell. A force (torque) applied between the side of the outer shell attached on the sixth joint and the side of the inner shell disposed on the end effector causes a change in a resistance of the strain gauge mounted on the beam, and the change is detected as a force (torque) signal by means of a bridge circuit. Furthermore, the acceleration sensor 402 includes a configuration in which a strain gauge 403 is fixed on an elongated, elastic beam 404 of which an end is secured on the side of the force (torque) sensor 401 and of which the other end is fixed on an object 405 having a mass. Like in the case of the force (torque) signal, the acceleration signal is sensed by detecting the change in the resistance of the strain gauge 403.

Since the structures of the force (torque) sensor and the acceleration sensor are respectively well known, details thereabout will not be described.

Figure 6:
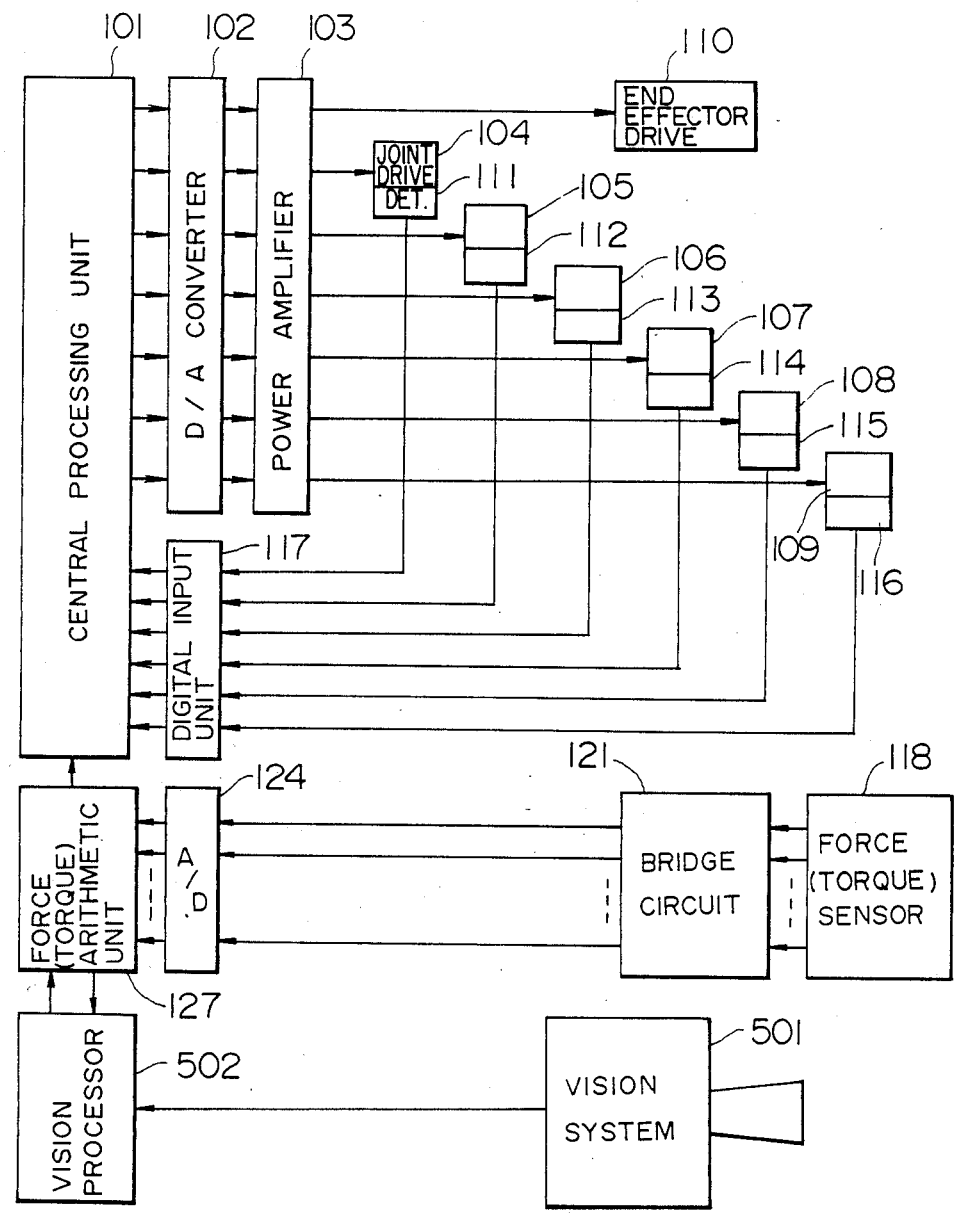
FIGS. 6 to 8 are system configuration diagrams of robot systems of other embodiments according to the present invention, respectively.

Next, referring to FIG. 6, description will be given of an example in which a visual device is employed in place of the acceleration sensor. The configuration of FIG. 6 comprises a vision system 501 for inputting a vision and a vision processor 502. In this apparatus, the visual image received by the vision system 502 is processed by the vision processor 502 such that the signal from the force-torque sensor 118 is regarded as valid under a condition that the inertia force is assumed to be zero when the image is in a stationary state. If the image is moving, the vision processor 502 computes the velocity and the acceleration of the image, so that the component of the inertia force may be removed from the signal attained by the force (torque) sensor 118 by use of the computed velocity and acceleration.

Figure 7:
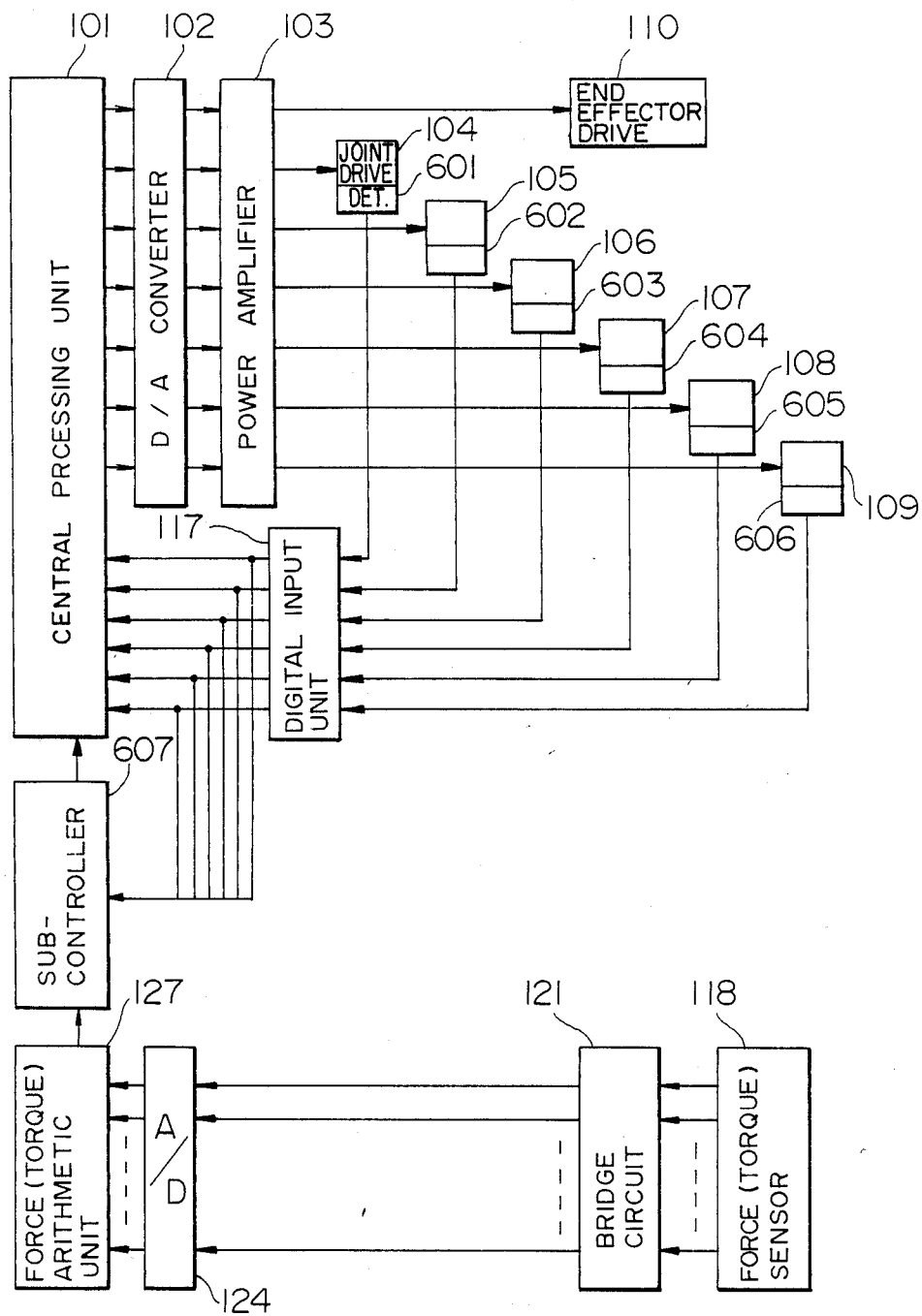

FIG. 7 shows an example in which position detectors 601 to 606 are used in place of the acceleration sensor of FIG. 1. In this configuration, output signals attained by the positional detectors 601-606 disposed at the respective joints are supplied as positional information to a sub-controller 607. In this situation, the signal from the force (torque) sensor 118 is regarded as valid under a condition that the inertia force is assumed to be zero when the end effector is considered to be in a stationary state. When the end effector is moving, the sub-controller 607 effects a transformation on positional information, which undergoes two operations of differentiation with respect to time so as to obtain an acceleration. By using the attained value, the inertia force is removed from the signal sensed by the force (torque) sensor 118.

Figure 8:
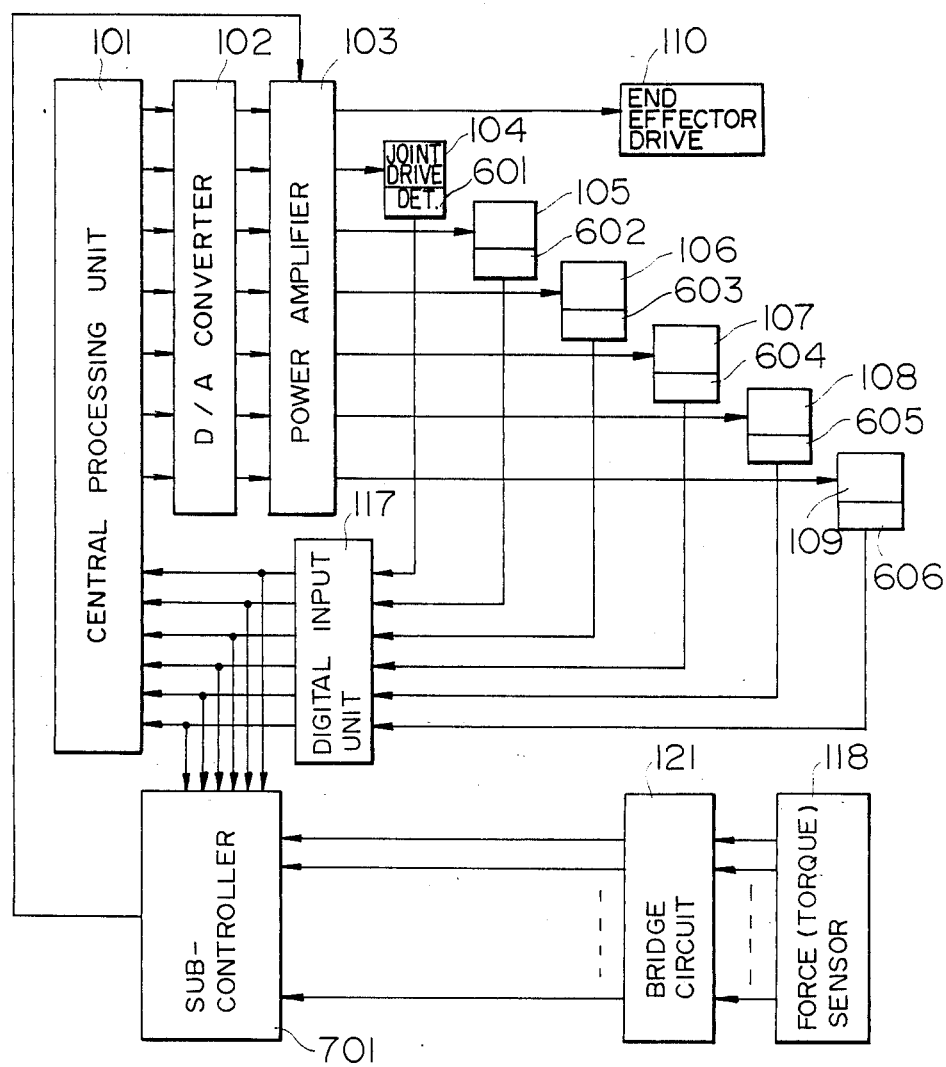

Furthermore, FIG. 8 shows a system example in which the force (torque) is fed back to a servo amplifier 103 without any intervention of the central processing unit 101. The sub-controller 701 effects computations based on information from the force (torque) sensor 118 and positional information from the position detectors 601 to 606 and achieves an operation on the gain of the servo amplifier 103 in accordance with the results of the computations as follows.

(1) When the position sense signals are changed and a signal is supplied from the force (torque) sensor 118, the gain of the power amplifier is increased for all axes depending on the value of the signal from the force (torque) sensor 118. This operation enables one to sustain only the acceleration without changing the direction of the movement.

(2) When the position sense signals are not changed and a signal is supplied from the force (torque) sensor 118, the gain is decreased for the axis associated with the detected signal in a direction in which the value sensed by the force (torque) sensor 118 is decreased (only for the axis associated with the sensed signal of the force (torque) sensor 118). In this state, the object is in contact with the end effector, and hence, the operation above is accomplished without imposing an excessive load on the end effector.

As described above, according to the present invention, since the inertia force can be removed from the sensed result of the force (torque) sensor, an accurate positioning control of a robot system is effected with a high precision.

While the present invention has been described with reference to the particular illustrative embodiments, it is not restricted by those embodiments but only by the appended claims. It is to be appreciated that those skilled in the art can change and modify the embodiments without departing from the scope and spirit of the present invention.

We claim:

1. A robot system comprising:
   a robot having at least a joint therein;
   joint drive means for driving said joint in said robot;
   hold means disposed at an end of said robot for holding an object;
   actuation means for actuating said hold means;
   sense means for sensing a force (torque) exerted on said hold means;
   second sense means for sensing an inertia force exerted on said hold means; and
   means responsive to the sensed results from said first and second sense means for determining a corrected external force by subtraction a sensed inertia force exerted on the object held by the hold means from the force sensed by said first sense means and controlling said joint drive means depending on said determined corrected external force.

2. A robot system according to claim 1 wherein said second sense means is comprised of an acceleration sensor.

3. A robot system according to claim 1 wherein said second sense means comprises:
   image detection means for detecting a movement of said hold means, and
   image processor for analyzing an output image from said image detection means.

4. A robot system according to claim 1 wherein said second sense means comprises:
   position detectors for detecting positions of said joints of said robot, and
   an arithmetic unit for effecting an arithmetic process on detected signals from said position detectors.

5. A robot system according to claim 1 wherein said first sense means and said second sense means are integrated in a single unit and said unit is connected between said robot and said hold means.

6. A robot system according to claim 1 wherein said control means includes:
   means for generating drive target values of said joint drive means depending on the sensed result from said first sense means, and
   means for correcting the drive target values depending on the sensed result from said second sense means so that the inertia force exerted on said object is removed from said force sensed by said first sense means.

7. A robot system comprising:
   a robot having at least a joint therein;
   joint drive means for driving said robot;

means disposed at an end of said robot for holding an object;
actuator means for actuating said hold means;
first sense means for sensing a force (torque) exerted on said hold means;
sense means for sensing an inertia force effected on said hold means;
third sense means for sensing an inertia force exerted on said robot; and
means for controlling said joint drive means depending on sensed results from said first, second, and third sense means.

8. A robot system according to claim 7 wherein said second sense means is comprised of an acceleration sensor.

9. A robot system according to claim 7 wherein said second sense means comprises:
image detection means for detecting a movement of said hold means, and
an image processor for analyzing an output image from said image detection means.

10. A robot system according to claim 7 wherein said second sense means comprises:
position detectors for detecting positions of said joints of said robot, and
an arithmetic unit for effecting an arithmetic process on detected signals from said position detectors.

11. A robot system according to claim 7 wherein said first sense means and said second sense means are integrally arranged in a unit so as to be connected between said robot and said hold means.

12. A robot system according to claim 7 wherein said third sense means is connected between a base securing said robot and a root portion of said robot.

13. A robot system according to claim 7 wherein said control means includes;
means for generating drive target values of said joint drive means depending on the sensed result from said first sense means, and
means for correcting the drive target values depending on the sensed result from said second sense means so that an inertia force exerted on the object is removed from the force sensed by said first sense means.

14. A robot system comprising:
a robot having at least a joint therein;
joint drive devices for driving said robot;
means disposed at an end of said robot for holding an object;
first sense means for sensing a force (torque) exerted on said hold means;
control means for generating control signals for said joint drive devices depending on the sensed result from said first sense means;
second sense means for sensing an inertia force exerted on said hold means; and
means for correcting the control signals from said control means depending on the sensed result from said second sense means and for supplying resultant signals to said joint drive devices so that an inertia force exerted on the object is removed from the force sensed by said first sense means.

15. A robot system according to claim 14 wherein said second sense means is comprised of an acceleration sensor.

16. A robot system according to claim 14 wherein said second sense means comprises:
a vision device for detecting a movement of said hold means, and
a vision processor for analyzing an output image said vision device.

17. A robot system according to claim 14 wherein said second sense means comprises:
position detectors for detecting positions of said joints of said robot hand, and
an arithmetic unit for effecting an arithmetic processing on detected signals from said position detectors.

18. A robot system according to claim 14 wherein said first sense means and said second sense means are integrally arranged in a unit so as to be connected between said robot and said hold means.

19. A robot system in a microgravity condition comprising:
a robot having at least a joint therein;
joint drive means for driving said joint in said robot;
gripper means disposed at an end of said robot for holding an object;
actuation means for actuating said gripper means;
first sense means for sensing a force (torque) exerted on said gripper means;
second sense means for sensing an inertia force exerted on said gripper means; and
means responsive to the sensed results from said first and second sense means for determining a corrected external force by subtracting a sensed inertia force exerted on the object held by the gripper means from the force sensed by said first sense means and controlling said joint drive means depending on said determined corrected external force.

20. A robot system in a microgravity condition comprising:
a robot having at least a joint therein;
joint drive means for driving said robot;
gripper means disposed at an end of said robot for holding an object;
actuator means for actuating said gripper means;
first sense means for sensing a force (torque) exerted said gripper means;
second sense means for sensing an inertia force exerted on said gripper means;
third sense means for sensing an inertia force exerted on said robot; and
means for controlling the joint drive means depending on sensed results from said first, second and third sense means.

21. A robot system according to claim 20 wherein said first sense means and said second sense means are integrally arranged in a unit so as to be connected between the robot and said gripper means and wherein said third sense means is connected between a base securing said robot and a root portion of said robot.

22. A robot system in a microgravity condition comprising:
a robot having at least a joint therein;
joint drive devices for driving said robot;
gripper means disposed at an end of said robot for holding an object;
first sense means for sensing a force (torque) exerted on said gripper means;
control means for generating control signals for said joint drive devices depending on the sensed result from said first sense means;
second sense means for sensing an inertia force exerted on said gripper means; and
means for correcting the control signals from said control means depending on the sensed result from said second sense means and for supplying resultant signals to said joint drive devices so that an inertia force exerted on the object is removed from the force sensed by said first sense means.

* * * * *